United States Patent [19]

Stevenson

[11] Patent Number: 5,360,566
[45] Date of Patent: Nov. 1, 1994

[54] HYDROCARBON REFRIGERANT FOR CLOSED CYCLE REFRIGERANT SYSTEMS

[75] Inventor: Richard Stevenson, Emmaus, Pa.

[73] Assignee: Intermagnetics General Corporation, Guilderland, N.Y.

[21] Appl. No.: 972,819

[22] Filed: Nov. 6, 1992

[51] Int. Cl.[5] ............................................. C09K 5/04
[52] U.S. Cl. ....................................... 252/67; 62/114
[58] Field of Search .......................... 252/67; 62/114

[56]       References Cited
       U.S. PATENT DOCUMENTS

| | | | |
|---|---|---|---|
| 2,511,993 | 6/1950 | Reed | 62/114 |
| 4,482,465 | 11/1984 | Gray | 252/67 |
| 4,495,776 | 1/1985 | Nikolsky et al. | 62/114 |
| 4,603,002 | 7/1986 | Nikolsky et al. | 252/67 |
| 4,622,825 | 11/1986 | Larve et al. | 62/102 |
| 4,851,144 | 7/1989 | McGraw et al. | 252/52 A |

FOREIGN PATENT DOCUMENTS

| | | |
|---|---|---|
| 1064299 | 9/1992 | China . |
| 0271989 | 11/1990 | European Pat. Off. . |
| 0419042A1 | 3/1991 | European Pat. Off. . |
| 54-37328 | 11/1979 | Japan . |
| 55-53520 | 4/1980 | Japan . |
| 1-139675 | 6/1989 | Japan . |
| 1152962 | 5/1969 | United Kingdom . |
| 1336892 | 11/1973 | United Kingdom . |
| 2228739 | 5/1990 | United Kingdom . |
| 379603 | 4/1973 | U.S.S.R. . |
| 565052 | 7/1977 | U.S.S.R. . |
| 627154 | 10/1978 | U.S.S.R. . |
| 637417 | 12/1978 | U.S.S.R. . |
| 676604 | 7/1979 | U.S.S.R. . |
| 907054 | 2/1982 | U.S.S.R. . |
| 918298 | 4/1982 | U.S.S.R. . |
| 966107 | 10/1982 | U.S.S.R. . |
| 1054400 | 11/1983 | U.S.S.R. . |
| 1086003 | 4/1984 | U.S.S.R. . |
| 1089099 | 4/1984 | U.S.S.R. . |
| 1090699 | 5/1984 | U.S.S.R. . |
| 1158567 | 5/1985 | U.S.S.R. . |
| 1592675 | 9/1990 | U.S.S.R. . |
| 92/16597 | 10/1992 | WIPO . |

OTHER PUBLICATIONS

Chemical Abstracts, vol. 70, No. 24, Acc. No. 107793h, Hafstrom, "When liquid nitrogen", 1969.
Boyarsky, Lunin, Mogorjichniy—Instructions for Students on "Separation and Use of Mixtures in Cryogenic Installations",
"Characteristics of Cryogenic Systems Operated with Mixtures-." Moscow, 1990.

*Primary Examiner*—Christine Skane
*Attorney, Agent, or Firm*—Helfgott & Karas

[57]           ABSTRACT

A non-toxic, non-flammable refrigerant for use in a closed cycle refrigeration system comprising a major component constituting between 75% and 95% by volume of the refrigerant and a minor component comprising between 5% and 25% by volume of the refrigerant. The major component consists of hydrocarbon, either a single hydrocarbon or mixtures of hydrocarbons. The minor component consists of constituents serving as both refrigerant and as flame retardants.

20 Claims, 11 Drawing Sheets

HYDROCARBON REFRIGERANT FOR CLOSED CYCLE REFRIGERANT SYSTEMS

BACKGROUND OF THE INVENTION

This invention relates to refrigerants, and more particularly, to a hydrocarbon refrigerant for use in a closed cycle refrigeration system.

Closed cycle refrigeration systems are well known and are typically used for household refrigeration, commercial refrigeration, freezer units, air conditioning units, heat pumps, and the like. Such systems use a refrigerant which can absorb surrounding heat while passing through an evaporator causing evaporation of the liquid refrigerant to a vapor. After the refrigerant has absorbed heat it is compressed thereby increasing its pressure. The high pressure fluid is passed through a condensing unit, typically located outside the refrigerated space. The heat in the refrigerant is given up to the surrounding, typically to the ambient air or to a liquid coolant. In the condenser, the refrigerant returns to its liquid state. It is then expanded through a throttle, valve or capillary tube to a low pressure fluid and is again sent into the refrigerating mechanism for absorbing heat.

In typical domestic refrigerators, the refrigerant temperatures in the evaporator are approximately 260° K. and the condensing temperature is approximately 300° K., which is slightly above ambient temperature. For freezing operations, the temperature may go a bit lower, and for air conditioning units, the temperature will be a bit higher. It should be understood, that reference to refrigeration in this application generally refers to such systems operating within the above general range of temperatures, including refrigeration, air conditioning and heat pumps, all of which are quite distinct from operating systems at cryogenic temperatures.

From a technical viewpoint, the refrigerant should have appropriate technical characteristics. For example, pressures under which it operates should be within a range of 1–20 atmospheres, and specifically, within the operation range of commercial refrigeration compressors. The high pressure boiling point should be approximately at ambient temperature. The low pressure dew point should be approximately at the freezing point of water.

Additionally, in order to be effective, the refrigerant should be non-toxic, non-flammable, and relatively inexpensive.

A wide group of refrigerants have typically been utilized for such refrigeration systems. Many of these are made up of compounds containing one or more of the halogens, including fluorine, chlorine, iodine and bromine. Those containing both chlorine and fluorine are generally referred to as halogenated chlorofluorocarbons. One group of such CFC refrigerants are sold under the brand name "Freon" which is a product of the DuPont Company. Various Freon formulations have been utilized, with each of these having differing temperature and pressure characteristics to conform to particular types of refrigeration systems. By way of example, Freon 12 (dichlorodifluoromethane) is a popular refrigerant in many refrigerator units. However, there are questions as to the environmental safety of such CFC's.

In addition to the halide refrigerants, other refrigerants have been suggested, such as ammonia methylchloride, and sulphur-dioxide. However, these are rather flammable or toxic and seldom utilized.

Certain types of refrigerants are utilized in open cycle refrigeration systems whereby the refrigerants are released to atmosphere. These are referred to as "expendable refrigerants" and include nitrogen, helium, and carbon dioxide. Certain hydrocarbons such as butane, ethane, and propane, are combustible and are not commonly used at all because of their combustible nature. In connection with cryogenic systems, however, it has been suggested to use hydrocarbons with nitrogen or helium. However, there has not been suggested the possibility of utilizing a mixture of hydrocarbons for effective closed cycle refrigeration use.

SUMMARY OF THE INVENTION

Accordingly, it is an object of the present invention to provide a refrigerant for use with closed cycle refrigeration systems which is non-toxic, non-flammable, and provides improved results and higher efficiencies than heretofore known refrigerants.

A further object of the present invention is to provide a non-toxic, non-flammable refrigerant which can be utilized without any, or at most, with a very small permissible amount of halogenated chlorofluorocarbons.

Still a further object of the present invention is to provide a non-toxic, non-flammable refrigerant comprising as its major component hydrocarbons.

Yet another object of the present invention is to provide a non-toxic, non-flammable refrigerant for use in a closed cycle refrigeration system which permits more effective utilization of heat exchangers, condensors and evaporators.

Briefly, in accordance with the present invention, there is provided a refrigerant for use in a closed cycle refrigeration system comprising a mixture of a major component and a minor component. The major component consists of hydrocarbons in an amount of between 70% and 95% by molar percent of the refrigerant. The minor component consists of constituents, which serve both as refrigerants and flame retardants. The minor component is in the amount of between 5% and 30% by molar percent of the refrigerant. The resultant refrigerant has a high pressure boiling point at approximately ambient temperature. It also exhibits a change in temperature along both its low pressure and high pressure isobars during condensation and evaporation.

DETAILED DESCRIPTION OF THE PREFERRED EMBODIMENTS

Figure 1:
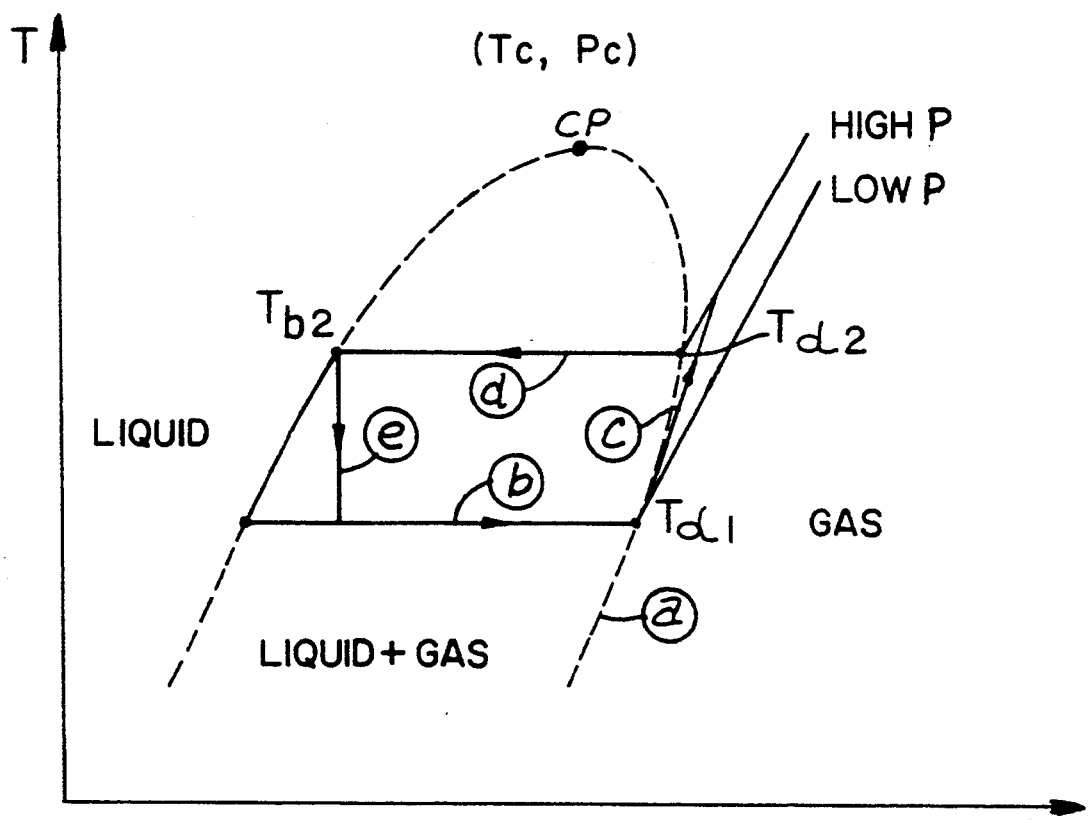
FIG. 1 shows a temperature-enthalpy curve showing the theoretical operation of a refrigerant in a closed cycle refrigerating system.

With reference now to FIG. 1, there is shown a temperature-enthalpy diagram of a pure substance which will be useful in explaining the operation of the closed cycle refrigeration system and the requirements of a refrigerant for use in such system. The phase diagram curve of the particular refrigerant separating the liquid and gaseous phases is shown by the dotted line curve "a" and is characterized by the critical point having the values Tc (critical temperature) and Pc (critical pressure) at its end. Beyond the critical point the distinctions between gas and liquid has no meaning.

For a given cycle, the refrigerant is passed through an evaporator, as shown by line "b" wherein the refrigerant passes from the liquid state to the gaseous state as it is extracting heat from the area required to be cooled. The refrigerant in the liquid state has a boiling point temperature Tb1 and a dew point temperature Td1. The evaporation takes place at a low pressure p1.

Following the evaporation, the refrigerant fluid is compressed along the line "c" in a compressor where its pressure is raised to a higher pressure p2. The fluid is then condensed from its gas phase to a liquid phase along the high pressure isobar "d". The dew point temperature at the high pressure is represented as Td2 and the boiling point temperature at this pressure is Tb2. The liquid refrigerant is then expanded along line "e" to the lower pressure p1 to repeat the cycle again.

Figure 2:
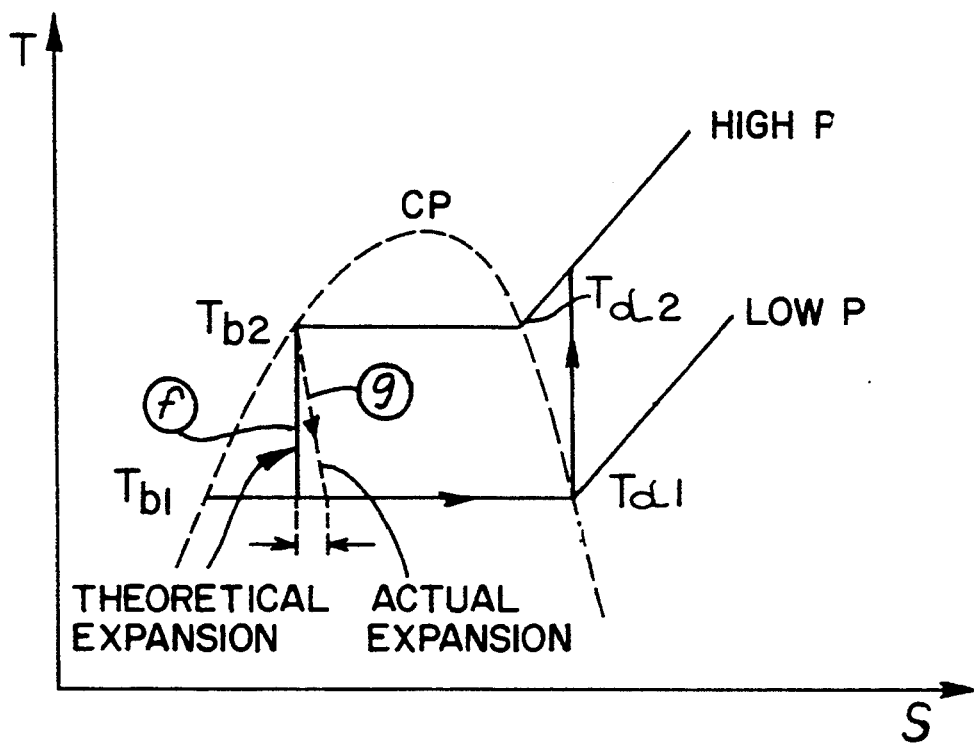
FIG. 2 shows a temperature-entropy curve for use in explaining the operation of the refrigerant.

FIG. 2 shows the phase diagram on a temperature-entropy graph. As shown, the expansion throttling along line "f" and the compression along line "i" should be isentropic. In practice, however, there is an increase in entropy due to throttling, as shown by line "g", which indicate a decrease of cycle efficiency, shown by the relative loss of entropy "h" with respect to the entropy of the evaporating portion of the cycle.

For refrigeration systems of the type herein defined, the boiling point temperature at the high pressure side is at approximately ambient temperature. This is to be distinguished from the case of cryogenic refrigerants when the boiling point temperature at the high pressure side is much lower than ambient and may be in the neighborhood of 85° K. Likewise, the pressures at which the refrigerant operates would be in the nature of approximately 1–20 atm or the typical operating pressures of refrigerator compressor units.

It will be noted from both FIGS. 1 and 2, that the isobar lines have constant pressure during the condensing and evaporating periods of generally known refrigerants for refrigeration operation are constant. Thus, the boiling point temperature and dew point temperature of the condensing isobar are equal and the isobar is horizontal on a temperature-entropy diagram. Likewise, the boiling point temperature and dew point temperature across the evaporating phase are also equal.

Figure 3:
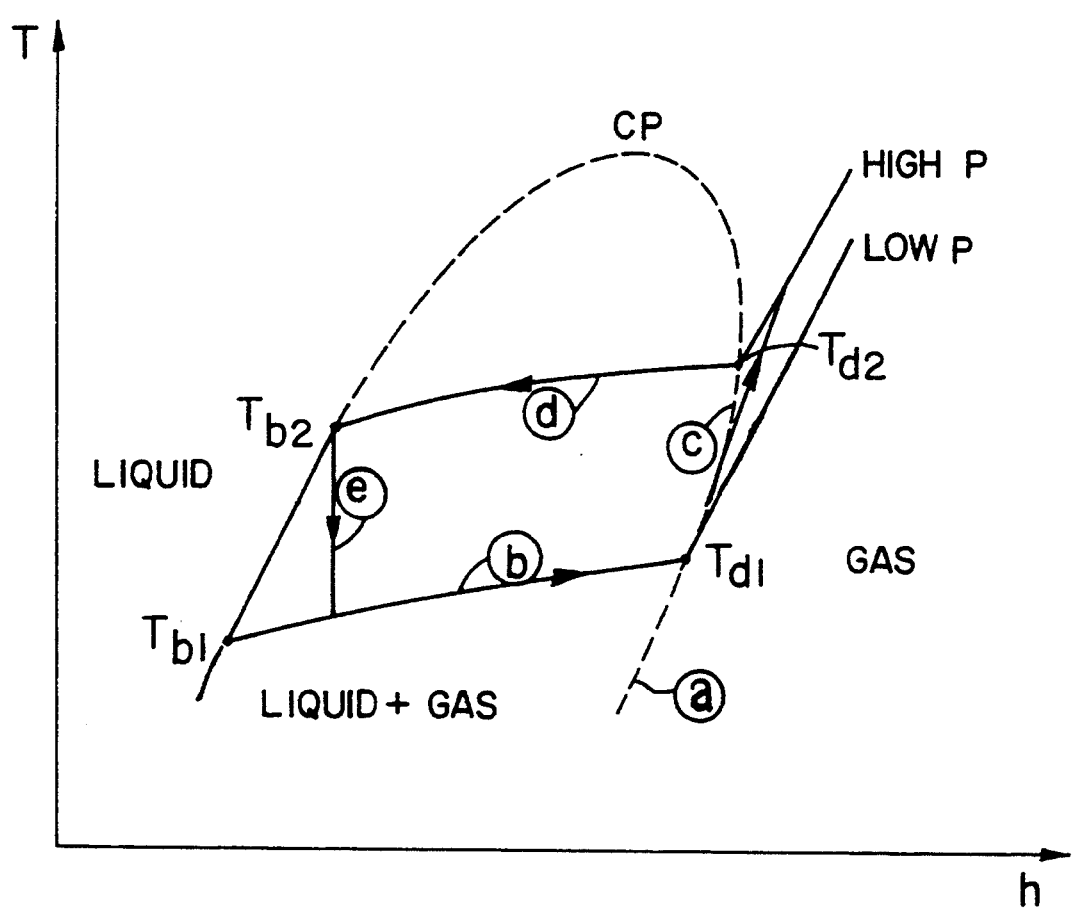
FIG. 3 shows a typical temperature-enthalpy curve for a refrigerant in accordance with the present invention.

Referring now to FIG. 3, there is shown a temperature-enthalpy graph of a typical refrigerant in accordance with the present invention. The refrigerant again operates within a closed cycle refrigeration system for the type of refrigeration equipment heretofore described, as compared to and distinct from cryogenic systems. Accordingly, the boiling point temperature at the high pressure is at approximately ambient temperature. Likewise, the system operate at typical refrigeration temperatures at between 1 atm and 20 atm, which is approximately the pressures in which standard refrigerating equipment operates.

It will be noted, however, that the isobars during condensing and evaporating are not constant in temperature. Accordingly, the boiling point temperature at the end of the condensing cycle is lower than the dew point temperature at the beginning of the cycle. Likewise, the boiling point temperature at the beginning of the evaporating cycle is lower than the dew point temperature at the end of the evaporating cycle.

Furthermore, the amount of change between the boiling point and dew point indicated as the temperature difference "n" is less than the temperature difference along an isenthalp (constant enthalpy) line shown as "m".

As will hereinafter be explained, this difference in temperature along the isobars brings about unusual and unexpected benefits in utilizing the refrigerant of the present invention. It specifically brings about improvement in efficiencies, better utilization of heat exchangers, and better application of the present refrigerant to particular types of refrigeration equipment.

A further benefit that has been noted within the refrigerants of the present invention relate to the efficiencies pointed out with respect to FIG. 2. Specifically, it is noted that with the refrigerants of the present invention the actual throttling of the refrigerant occurs much closer to an isentropic line, as shown in FIG. 2, line "f" than the typical lines "g" which occurs in utilizing previously known refrigerants. As a result, there is relatively less loss in the utilization of the present refrigerant as compared to prior refrigerant.

Ambient temperature as used herein is defined as the temperature of the available coolant which might be the actual ambient temperature of air, or the temperature of mains water, or the temperature of water or some fluid from a chiller. The actual pressure of the isobar will be limited by the capabilities of available compressors.

The particular refrigerant of the present invention provides a mixture of gases, the entirety of which or the substantial part of which represent hydrocarbons. While typically such hydrocarbons are inflammable and have therefore not been utilized, the present invention includes a minor component which adds flame retardants to the material. However, the flame retardants that are included also serve as refrigerants. As a result, the resulting refrigerant makes use of hydrocarbons, but provides an effective hydrocarbon refrigerant which is non-flammable and non-toxic.

In selecting the major component, a hydrocarbon is initially utilized having thermodynamic properties which approximate the desired properties of the closed cycle refrigeration system in which it is to be used. Such major component should constitute between 70% and 95% of the total refrigerant. It can either consist of a single hydrocarbon or a combination of hydrocarbons. By way of example, the hydrocarbons that can be used either alone or in combination include the alkane group, and specifically, propane, n-pentane, i-pentane, ethane, n-butane, i-butane, n-hexane, n-heptane, n-octane, and the like. It can also include such other hydrocarbons and hydrocarbons altered by hydrogen substitution. As such, the use of hydrocarbon in this application also includes hydrocarbons altered by hydrogen substitution. However, the claims in this application are limited to hydrocarbons not altered by hydrogen substitution. Other such ingredients which can be used include ethylene, acetylene, R-134a, R-12, R-318, R-142, R-160, $C_5H_{10}$, ethylene oxide, R-113, propropionic acid, toluene, dimethyl-o-toluindine, dimethylaniline, chlorobenzene, bromobenzene, and others.

The minor component can consist of a single one or a mixture of substances serving both as the refrigerant and the flame retardant. By way of example, it can include carbon dioxide, R-134a, or the like. Additionally, to the extent that it is used only in small percentages which can be environmentally acceptable, Freon refrigerants can also be included as the minor component.

Figure 4:
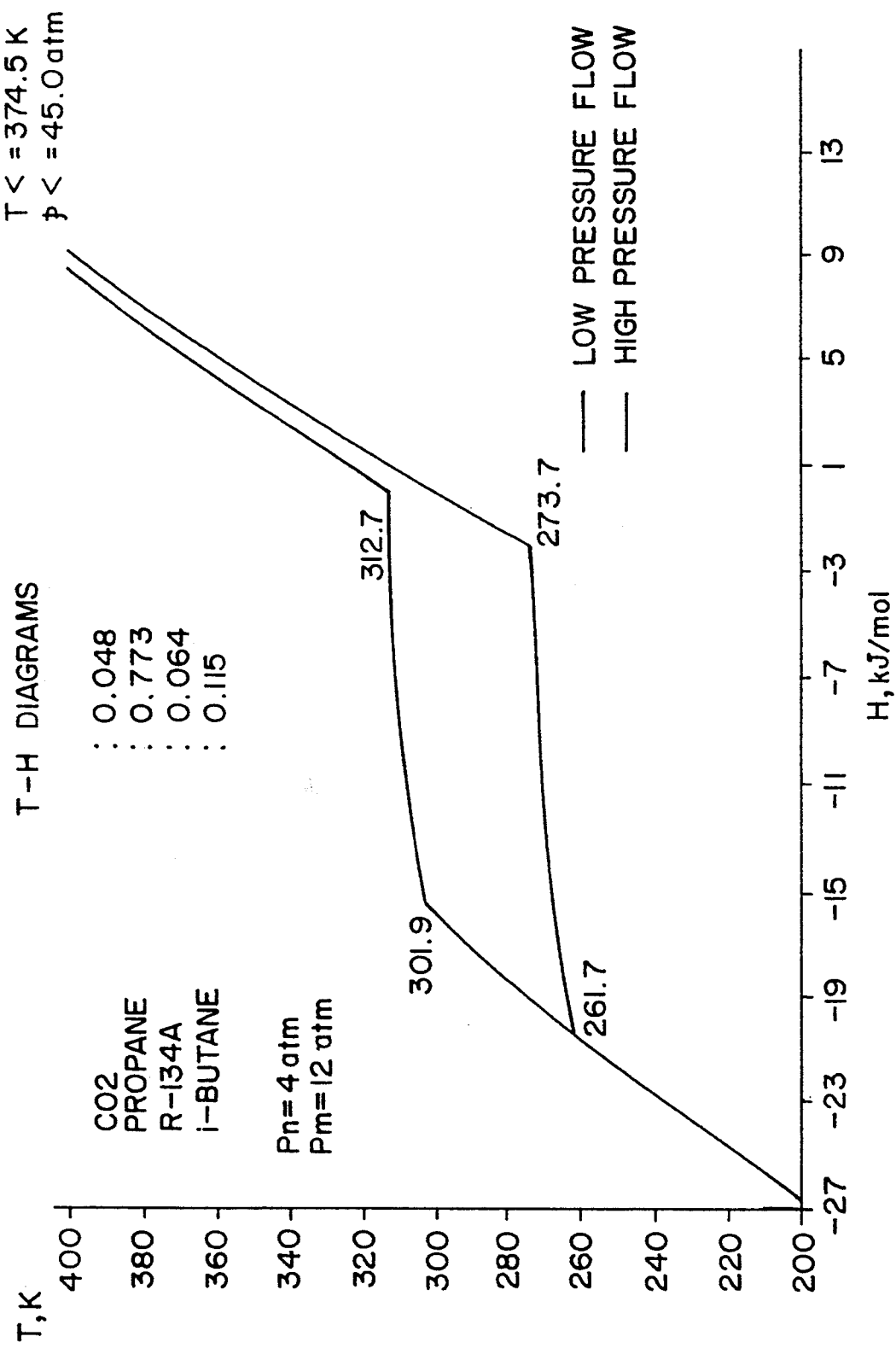
FIGS. 4–12 show specific temperature-enthalpy diagrams for particular examples described in the present invention.

By way of example (Example 1), a specific mixture which has been found to make an excellent substitute for the Freon refrigerent R-12 has the following composition by molar volume percent of the mixture: propane—77.3%; iso-butane—11.5%; carbon dioxide—4.8%; and R-134a—6.4%. The temperature-enthalpy curve of such mixture is shown in FIG. 4. The resulting mixture has a critical temperature of 374.5° K. and a critical pressure of 45.0 atm. When operated between a low pressure flow of 4 atm and a high pressure flow of 12 atm, the low pressure and high pressure boiling points are respectively 261.7° K. and 301.9° K., and the low pressure and high pressure dew points are respectively 273.7° K. and 312.7° K.

With prior refrigerants, as was described, the temperature along the condensing part of the curve remains constant, so that the dew point temperature and boiling point temperature along the higher pressure isobar are equal. Likewise, along the evaporating part of the cycle, the dew point and boiling point temperatures are equal. With the present refrigerant, there exists a temperature difference along these isobars.

The temperature difference along the isobars brings unexpected benefits. For pure substance refrigerants the low temperature isobar is at a constant temperature which is inconvenient for use in a refrigerator since the freezer compartment should be operated at a lower temperature than the food storage compartment. With the refrigerants we describe here, since the cooling by evaporation starts out at a lower temperature than it finishes, a much more efficient and convenient mode of operation is possible. The refrigerant is first sent to the freezer compartment and by the time it has done its duty there it is sent at a higher temperature to the food storage compartment.

The general characteristics of the curve thereby can allow for superior effects not heretofore achieved with prior refrigerants. Specifically, it can thereby permit a two temperature level refrigerating operation, thereby permitting better use of the physical characteristics of the refrigerant to first cool a freezer compartment and then subsequently cool a refrigeration compartment.

An additional benefit is to permit generally lower temperature levels than are currently available from pure substance refrigerants at the lower operating pressures and, hence, longer periods of the "off" part of the cycle compared to the "on" part when electricity is consumed to produce the refrigeration, at comparable pressure levels.

Furthermore, because of the possibility of having a dew point temperature on the low pressure side, compression efficiencies can possibly be obtained by compressing the gas-vapor combination, rather than allowing the refrigerant to "super heat" as is common place with prior refrigerants.

An important improvement that was noted is with respect to the efficiency of the system. Such efficiency comes about from the shape of the characteristic of the curve of the gas mixture, and specifically along the condensing part of the curve. The condensing heat transfer is generally to ambient air. Occasionally, it may be to a stream of liquid coolant which operates at approximately the same temperature. The air or coolant increases in temperature as it removes energy from the condensing refrigerants. In Freon systems, the temperature of condensation is constant, thus the temperature difference between the condensing Freon and the external coolant increases as the coolant removes more energy.

In complete contrast to pure substance refrigerants, with the cycle shown in FIG. 4 resulting from the present mixture, a more or less constant temperature difference can be maintained between the external coolant and the condensing refrigerant. This causes an energy efficiency because of greatly improved performance of the condenser heat exchanger, an efficiency which cannot be obtain from Freon refrigerants, even in theory. A similar improvement in energy efficiency can be obtained from the evaporator heat exchanger, if the external coolant operates under conditions of varying temperatures, as in the case with an air conditioner.

In tests conducted by replacing existing Freon refrigerants with the above gas mixture, reduction in energy consumption in the neighborhood of 15% have been noted. Further improvements would be possible by further optimizing the refrigerating performance by varying the composition and varying the pressure levels between which the refrigerant operates. Likewise, by providing an optimum match between the compression ratio of the compressor and the operating characteristics of the mixture, additional improvement can result.

Figure 5:
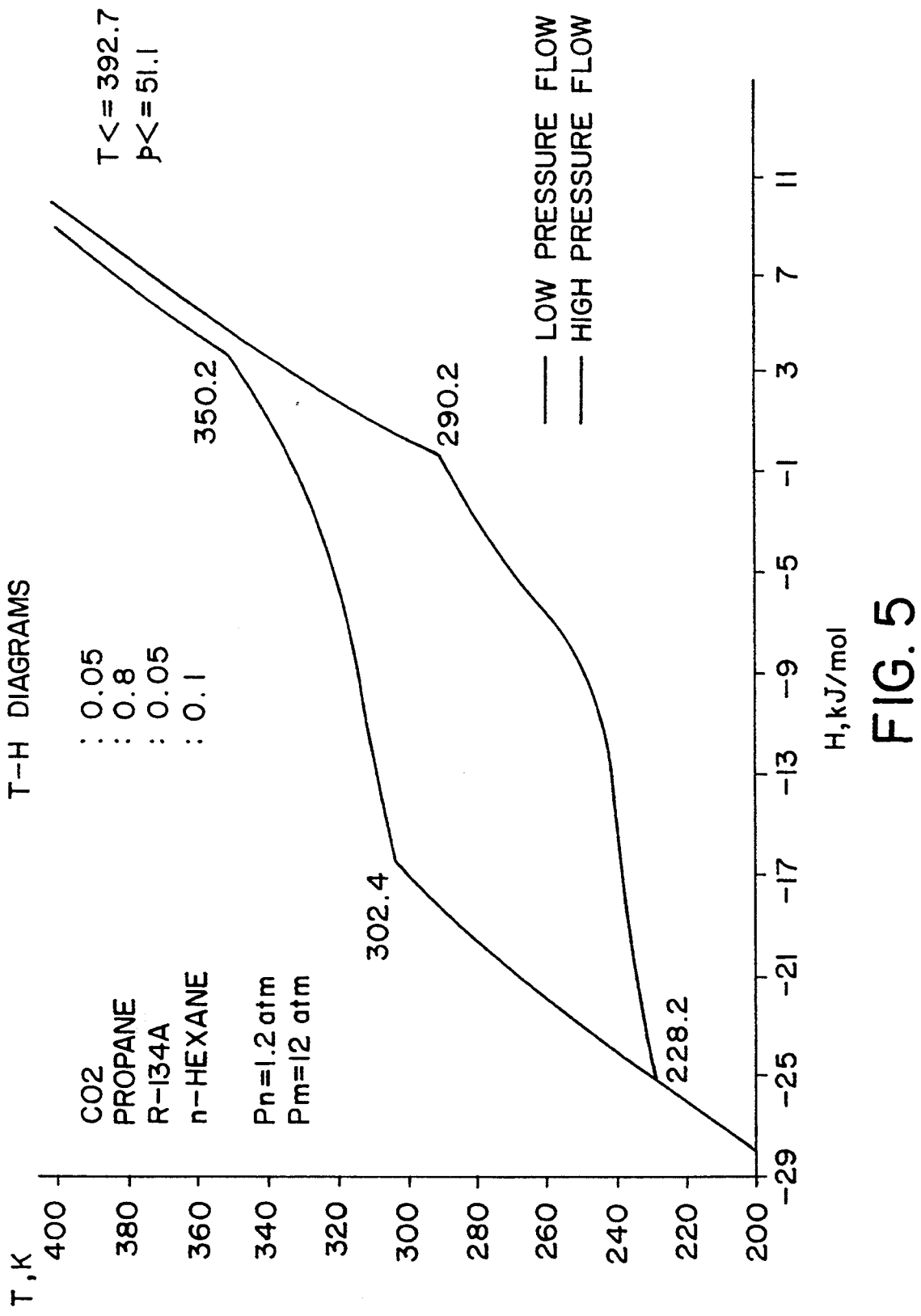

By changing the ingredients and pressure levels, particular refrigerants can be designed to meet specific needs. As an example of tailoring the curve to specific needs, reference is made to Example 2: propane—80%; n-hexane—10%; $CO_2$—5%; R—134a—5%: the T-h curve of the resulting mixture is shown in FIG. 5.

In addition to the above example, the shape of the temperature-enthalpy curve can be modified to bring about desired temperature and pressure levels to meet specific requirements by either varying the proportions of the mixture and/or varying the initial properties. By way of examples, the following further examples are provided:

Example 2 —propane—70%; $CO_2$ —10%; R—134a—10%; i-butane—10%.

Figure 6:
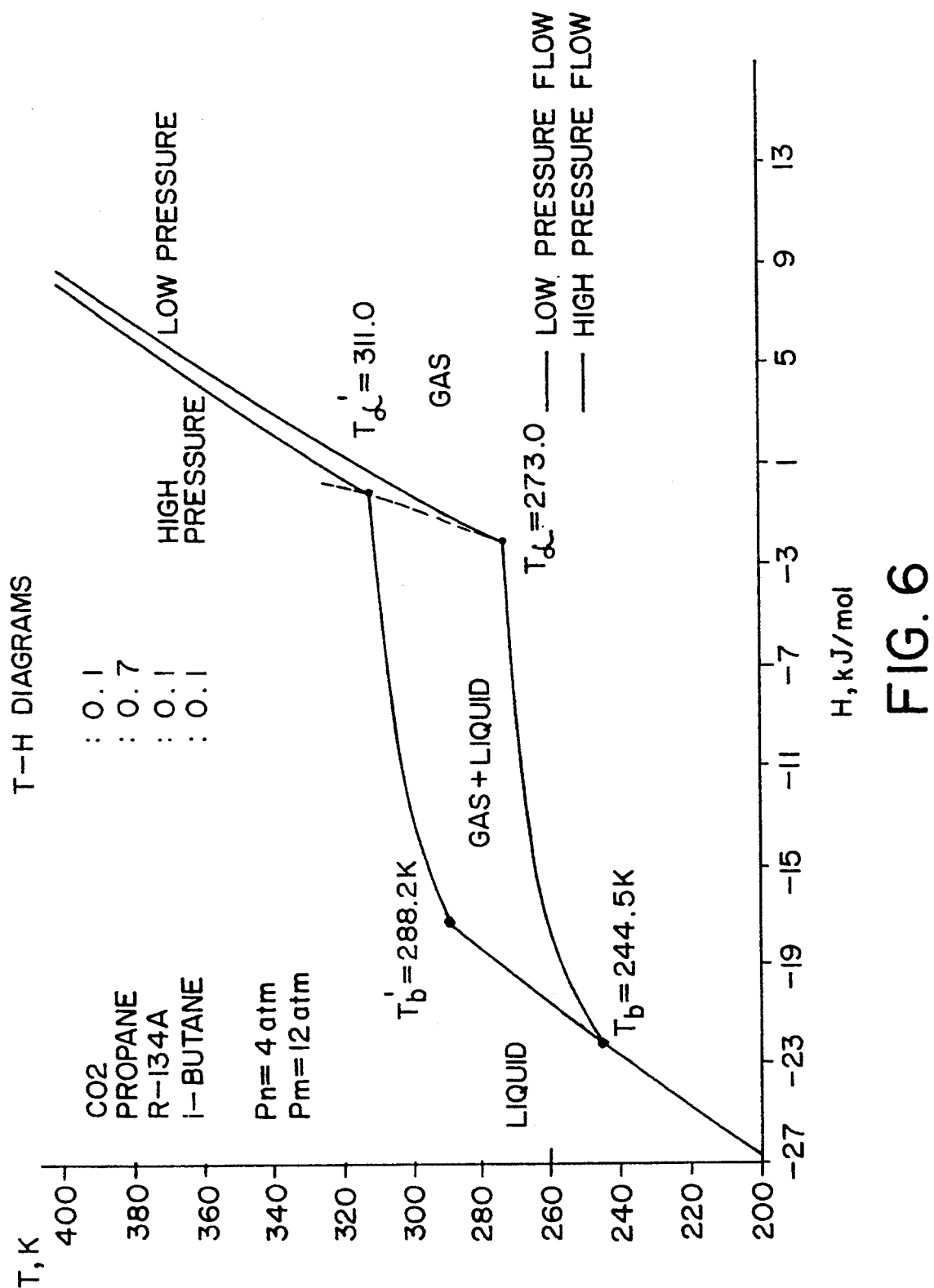

The T-h curve of the resulting gas mixture is shown in FIG. 6

Example 3 —propane—80%; n-hexane—10%; R-134—5%; $CO_2$—5%.

Figure 7:
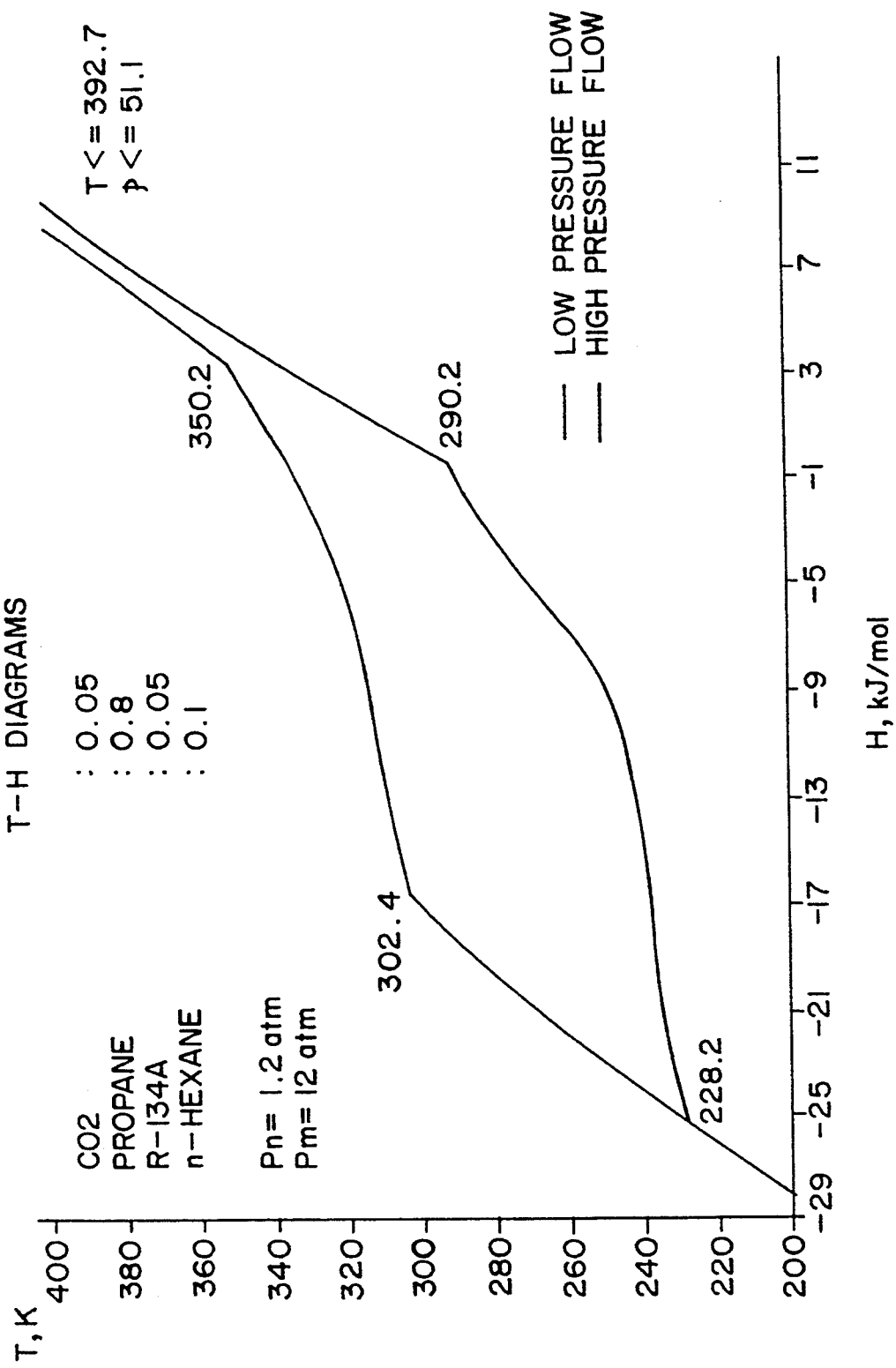

The T-h curve of the resulting gas mixture is shown in the attached FIG. 7.

Example 4—ethane—34%; i-butane—55%; $CO_2$—5%; R-134a—6%.

Figure 8:
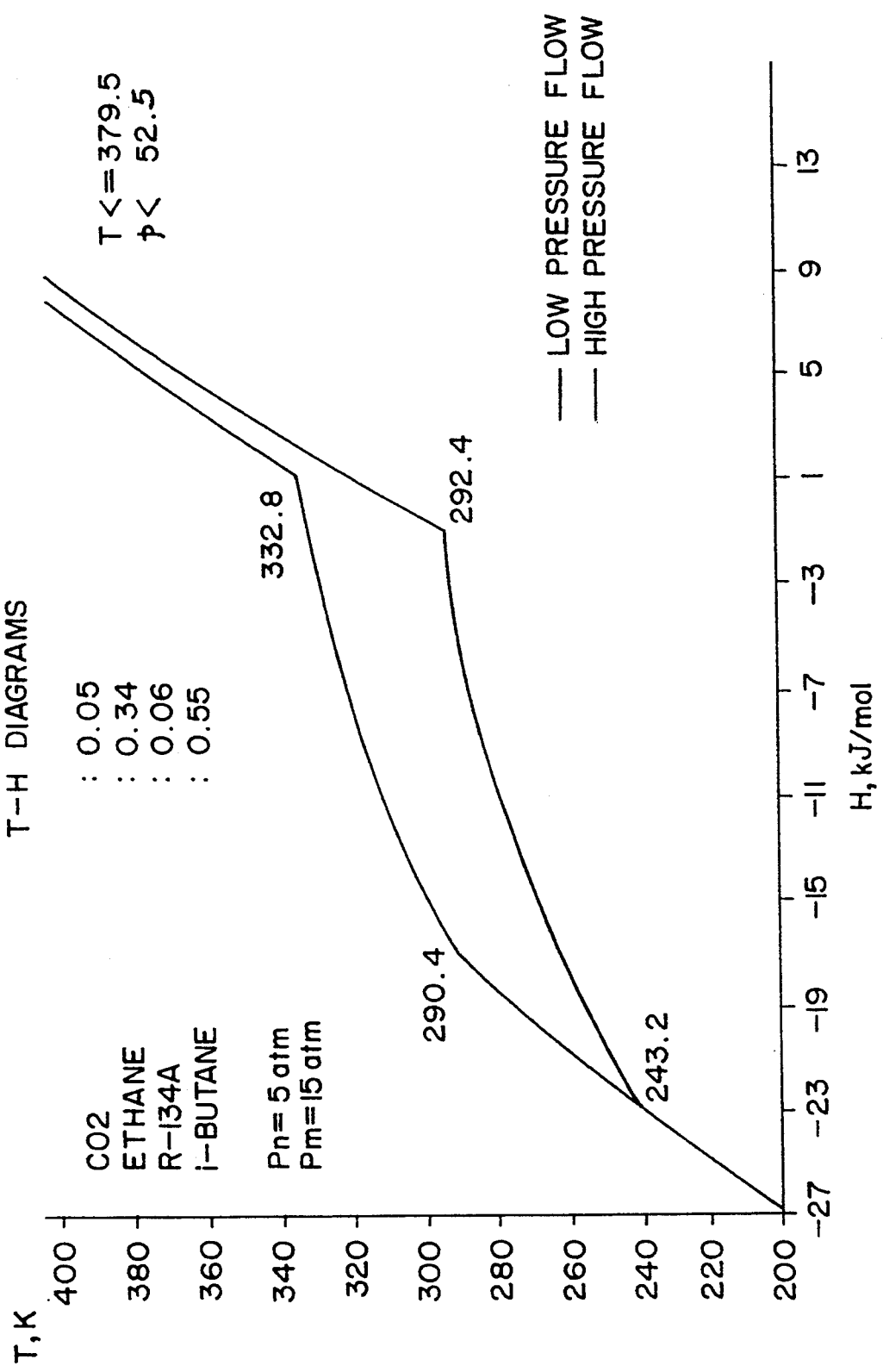

The T-h curve of the resulting gas mixture is shown in the attached FIG. 8.

Example 5—ethane—30%; i-butane—50%; propane—10%; $CO_2$—4%; R-134a—6%.

Figure 9:
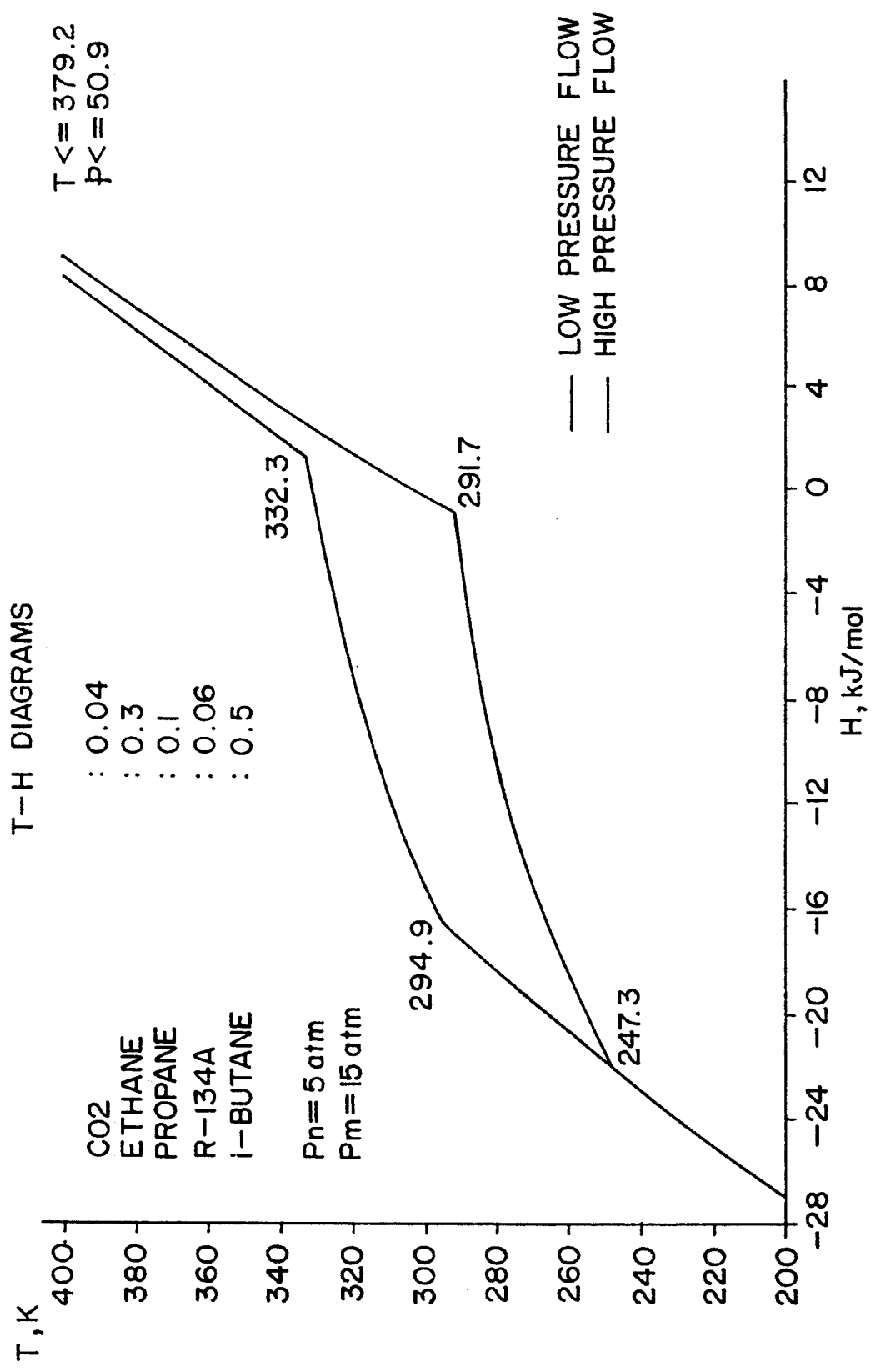

The T-h curve of the resulting gas mixture is shown in the attached FIG. 9.

Example 6—ethane—32%; i-butane—52%; propane—10%; R-134a—6%.

Figure 10:
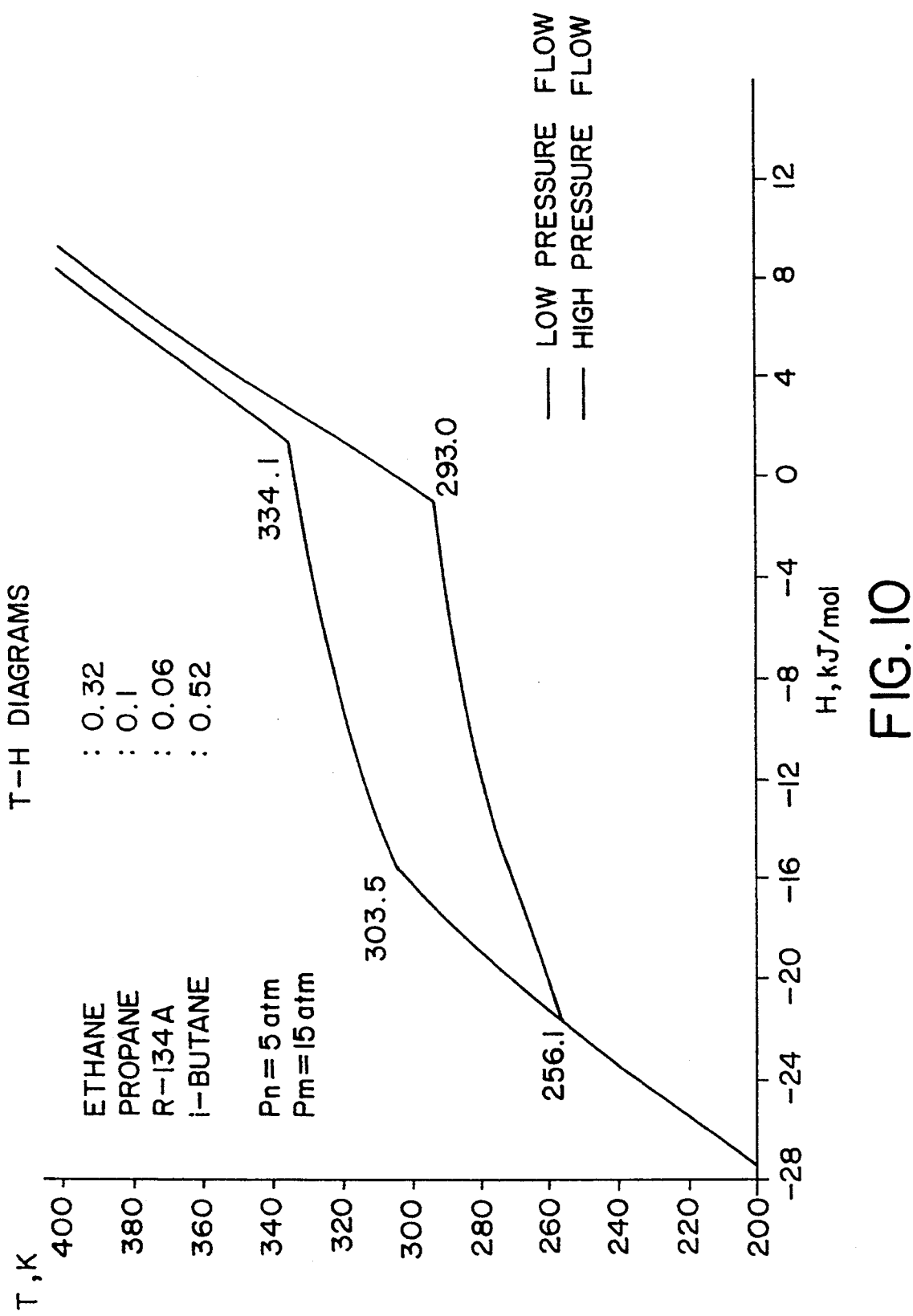

The T-h curve of the resulting gas mixture is shown in the attached FIG. 10.

Example 7—ethane—32%; i-butane—57%; R-134a—6%.

Figure 11:
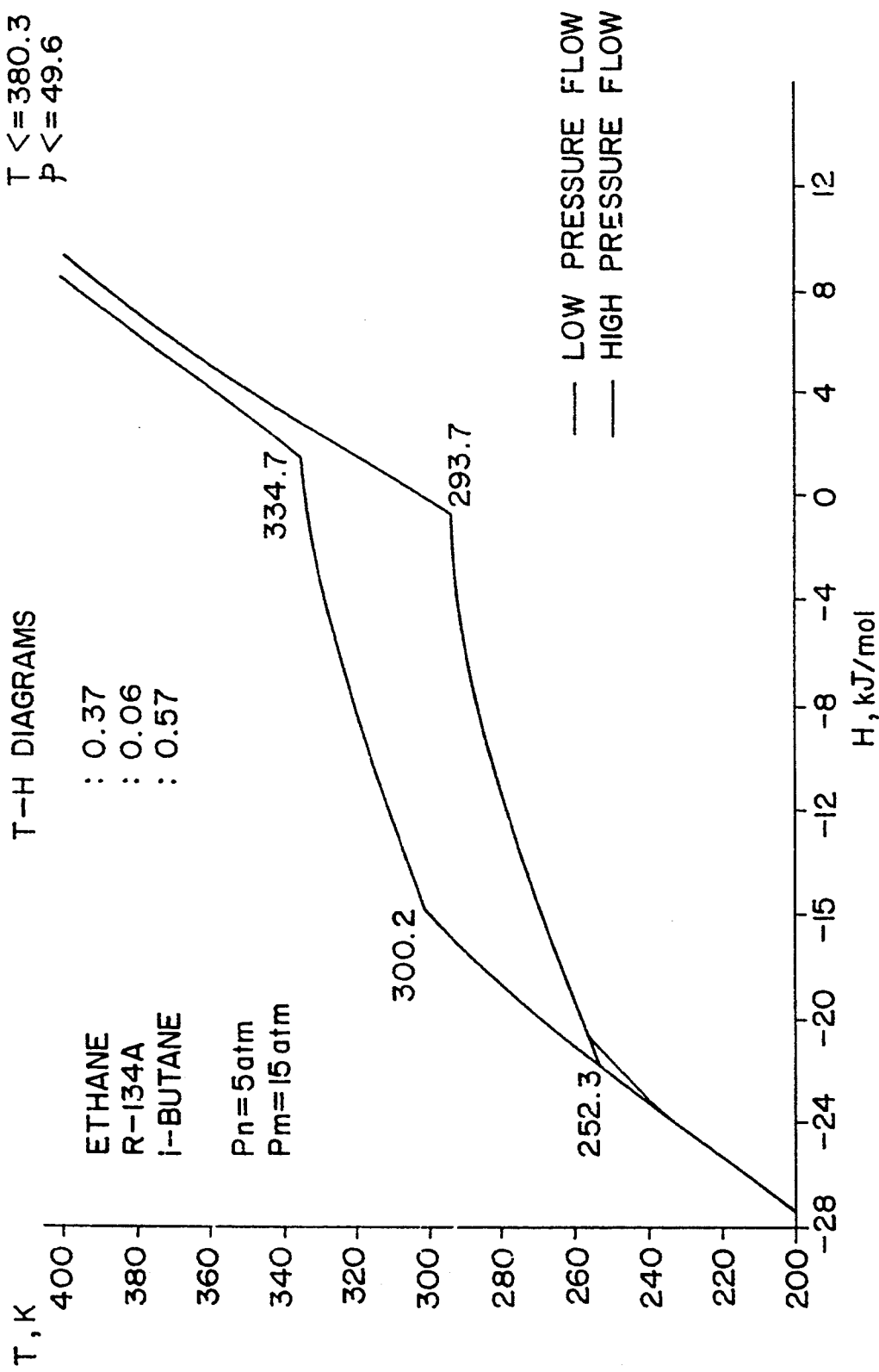

The T-h curve of the resulting gas mixture is showing in the attached FIG. 11.

Example 8—propylene—80%; i-butane—10%; R-134a—5%; $CO_2$—5%.

Figure 12:
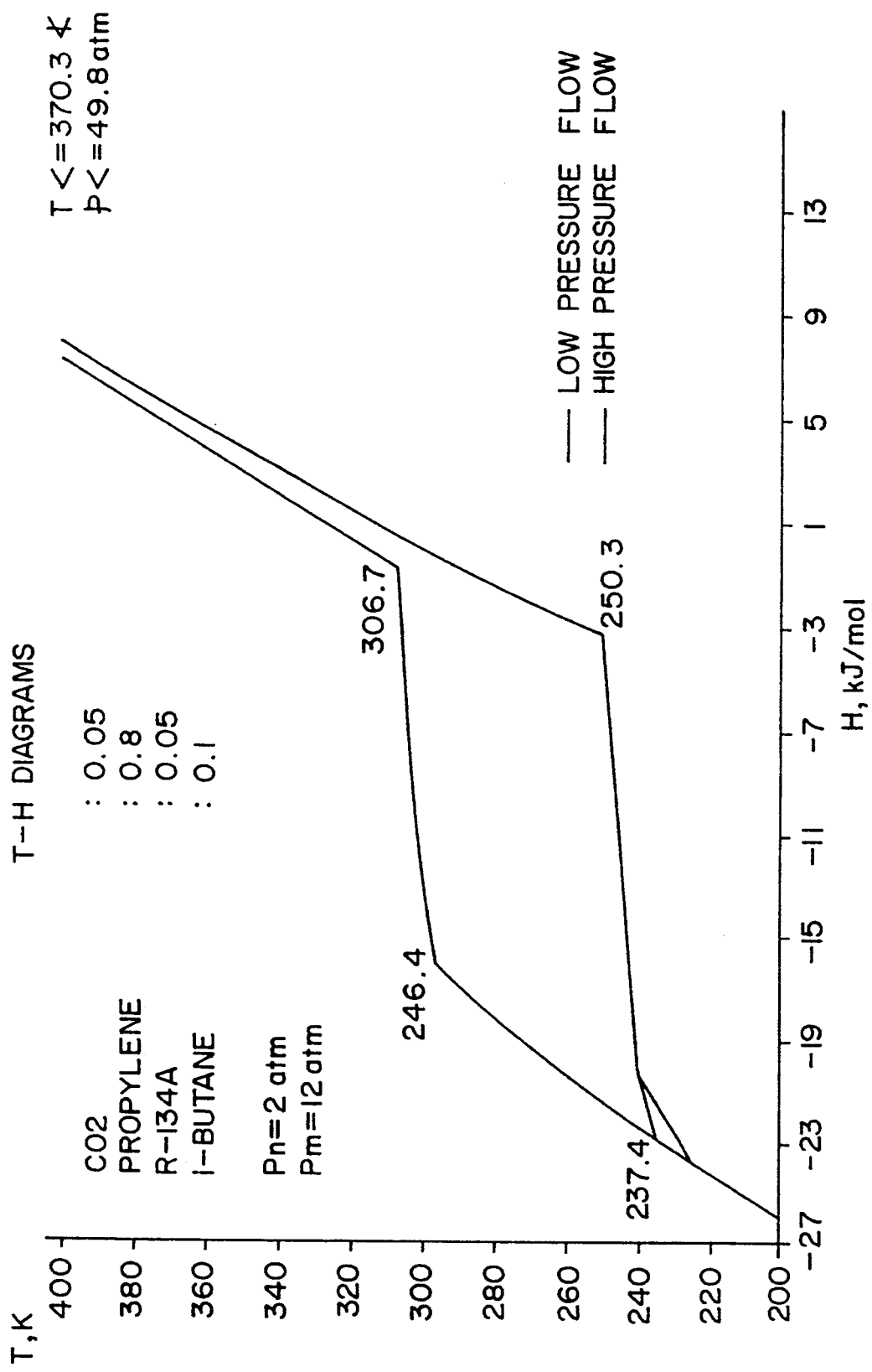

The T-h curve of the resulting gas mixture is shown in the attached FIG. 12.

It has been found that propane is by far the most suitable base material. Generally, it was also found that the critical temperature of the mixture should preferably be below 400° K. and above 320° K., and preferably, approximately 375° K. The critical pressure of the mixture should be preferably less than 60 atm, and generally greater than 30 atm, and generally approximately 45 atm. Accordingly, a base material which would be useful could be a hydrocarbon.

While the invention has been described in connection with various embodiments thereof, many modifications may be made, and it is intended by the appended claims to cover all such modification as fall within the scope and spirit of the invention claimed.

I claim:

1. A non-toxic, non-flammable refrigerant free of halogenated chlorofluorocarbons for use in a closed cycle refrigeration system, consisting of a mixture of:
a major component and a minor component, said major component consisting of at least two and not more than three hydrocarbons in an amount of between 70% and 95% by molar percent of the refrigerant, and said minor component consisting of $CO_2$ and other constituents serving both as refrigerants and as flame retardants, said minor component being in an amount of between 5% and 30% by molar percent of the refrigerant, said refrigerant having a boiling point temperature at the higher operating pressure of the closed cycle refrigeration system approximating ambient temperature for the operating pressures of the refrigeration systems.

2. A non-toxic, non-flammable refrigerant as in claim 1, wherein the boiling point temperatures are lower than the dew point temperatures for both the low pressure and high pressure isobars.

3. A non-toxic, non-flammable refrigerant as in claim 2, wherein the temperature difference between the boiling point temperature and the dew point temperature of the high pressure isobar is less than an isenthalpic temperature difference between the low pressure isobar and the high pressure isobar.

4. A non-toxic, non-flammable refrigerant as in claim 1, characterized by its thermodynamic properties in that the refrigerant decreases in temperature during the condensation phase of the closed cycle refrigeration system and increases in temperature during the evaporation phase of the closed cycle refrigeration system.

5. A non-toxic, non-flammable refrigerant as in claim 1, wherein the lower operating pressure is within the range of 1 atm–4 atm, and the higher operating pressure is within the range of 10 atm–20 atm.

6. A non-toxic, non-flammable refrigerant as in claim 8, wherein the lower operating pressure is at 4 atm and the higher operating pressure is at 12 atm.

7. A non-toxic, non-flammable refrigerant as in claim 1, wherein at least one of the hydrocarbons is an alkane.

8. A non-toxic, non-flammable refrigerant as in claim 9, wherein at least one of the hydrocarbons is selected from the group consisting of propane, pentane, ethane, butane, and hexane.

9. A non-toxic, non-flammable refrigerant as in claim 1, wherein said major component consists of a mixture of alkanes and other hydrocarbons selected from the group consisting of ethylene and propylene.

10. A non-toxic, non-flammable refrigerant as in claim 1, wherein said minor component consists of carbon dioxide.

11. A non-toxic, non-flammable refrigerant as in claim 1, wherein said other constituents consists of R-134a.

12. A non-toxic, non-flammable refrigerant as in claim 1, wherein said major component consists of a mixture of propane and iso-butane, and said minor component consists of a mixture of carbon dioxide and R-134a.

13. A non-toxic, non-flammable refrigerant as in claim 1, wherein the amount of the ingredients, by molar percent is:
propane in the range of 70–90%
iso-butane in the range of 5–15%
R-134a in the range of 2.5–7.5%
$CO_2$ in the range of 2.5–7.5%

14. A non-toxic, non-flammable refrigerant as in claim 1, consisting of, by molar percent:
propane: 77.3 %
iso-butane: 11.5%
$CO_2$: 4.8 %
R-134a: 6.4%

15. A non-toxic, non-flammable refrigerant as in claim 1, wherein said major component consists of a mixture of propane and n-butane, and said minor component comprises a mixture of carbon dioxide and R-134a.

16. A non-toxic, non-flammable refrigerant as in claim 1, wherein the amount of the ingredients, by molar percent is:
propane in the range of 70–90%
n-butane in the range of 5–15%
R-134a in the range of 2.5–7.5%
$CO_2$ in the range of 2.5–7.5%

17. A non-toxic, non-flammable refrigerant as in claim 1, consisting of, by molar percent is:
propane: 77.3%
n-butane: 11.5%
$CO_2$: 4.8%
R-134a: 6.4%

18. A non-toxic, non-flammable refrigerant free of halogenated chlorofluorocarbons for use in a closed cycle refrigeration system, consisting of a mixture of:
a major component and a minor component, said major component consisting of at least two and not more than three hydrocarbons in an amount of between 70% and 95% by molar percent of the refrigerant, and a minor component consisting of $CO_2$ and other constituents serving both as refrigerants and as flame retardants, said minor component being in an amount of between 5% and 30% by molar percent of the refrigerant, said refrigerant having the thermodynamic property which is characterized in that the boiling point temperatures are lower than the dew point temperatures for both the low pressure and high pressure isobars.

19. A non-toxic, non-flammable refrigerant as in claim 18, wherein the temperature difference between the boiling point temperature and the dew point temperature of the high pressure isobar is less than an isenthalpic temperature difference between the low pressure isobar and the high pressure isobar.

20. A refrigerant for use in a closed cycle refrigeration system consisting of a mixture of a major component and a minor component, said major component consisting of selected from the group consisting of ethylene, ethane, propylene and propane, and n-pentane in an amount of between 70% and 95% by molar percent of the refrigerant, and a minor component consisting of R-134A, said minor component being in an amount of between 5% and 30% by molar percent of the refrigerant.

* * * * *

UNITED STATES PATENT AND TRADEMARK OFFICE
CERTIFICATE OF CORRECTION

PATENT NO.   :   5,360,566
DATED        :   November 1, 1994
INVENTOR(S)  :   Richard Stevenson et al.

It is certified that error appears in the above-identified patent and that said Letters Patent is hereby corrected as shown below:

On the title page please change the list of inventors to read:

[75] Inventors: Richard Stevenson of Emmaus, and Mikhail Boyarsky of Allentown, both from Pennsylvania--

Signed and Sealed this

Seventeenth Day of January, 1995

Attest:

BRUCE LEHMAN

*Attesting Officer*        *Commissioner of Patents and Trademarks*